Oct. 17, 1972     A. A. GREGOLI ET AL     3,698,876

VAPOR LIQUID SEPARATION APPARATUS

Filed Dec. 17, 1970

INVENTOR.
ARMAND A. GREGOLI
WILLIAM R. MOUNCE
BY J. Richard Geaman

ATTORNEY

United States Patent Office 3,698,876
Patented Oct. 17, 1972

3,698,876
VAPOR LIQUID SEPARATION APPARATUS
Armand A. Gregoli, Somerville, and William R. Mounce, Cranbury, N.J., assignors to Cities Service Research & Development Company
Filed Dec. 17, 1970, Ser. No. 99,203
Int. Cl. B01d 50/00; B01j 9/16; C10g 23/00
U.S. Cl. 23—288 E                          5 Claims

ABSTRACT OF THE DISCLOSURE

Apparatus for effecting improved vapor-liquid separation in an upflow refining vessel is shown. In combination with the upflow type vessel, the apparatus comprises a centrally mounted vertical recycle conduit having a funnel shaped downcomer, a liquid drawoff pipe having a widemouth downwardly directed inlet located above the downcomer, a drawoff pan having a cone shape bottom and sidewalls rising above the level of the drawoff pipe inlet mounted between the downcomer and the inlet, and a deflector mounted within the downcomer. A set of vertically mounted vanes is positioned within the downcomer section just above the recycle conduit joint.

BACKGROUND OF THE INVENTION

This application relates to improved apparatus for separating liquid from vapor in an upflow reactor vessel. More particularly, the invention concerns apparatus for use with an internal liquid recycle conduit in an upflow type reactor vessel for more effective vapor-liquid disengagement and withdrawal and applicable to an upflow, high pressure, high temperature reactor vessel for hydroconverting a residual oil.

In various processes it is necessary to separate reactant liquids from vapors. Such a separation may be effected either in the reaction vessel itself where the product may be vapor or may be the result of subsequent treatment in various vessels including process equipment such as flash separators, counterflow towers, etc. The present invention concerns improved apparatus for effecting vapor-liquid separation or disengagement in an upflow reactor vessel which has separate liquid and vapor effluent withdrawal outlets and an internal liquid recycle. In such a process intermediate or heavy hydrocarbon oils, such as petroleum residuums, virgin and cracked gas oils, decant oils, natural or by-products tars and shale oils are contacted with hydrogen in an amount exceeding a few hundred cubic feet of hydrogen per barrel of feed in the presence of an expanded bed of particulate catalyst. The feed and hydrogen is preferably introduced into the vessel at the bottom and caused to flow upwardly through the catalyst bed to a point above the bed. The resulting fluids are then withdrawn and in this particular case, a portion of the upflowing fluids principally in the liquid phase are internally recycled back to the bottom of the vessel in order to produce sufficient upflow superficial velocities through the catalyst bed to expand the bed and induce random motion among the catalyst particles. Such a process and reactor vessel is illustrated in U.S. Pat. Re. 25,770 issued to E. S. Johanson on Apr. 27, 1965 and more particularly in U.S. Pat. No. 3,388,671 issued June 18, 1968 to C. W. Stokes et al. Other patents illustrative of the process to which this apparatus is applicable are U.S. Pat. No. 3,188,286 issued June 8, 1965 to R. P. Van Driesen and U.S. Pat. No. 3,338,820 issued Aug. 29, 1967 to R. H. Wolk et al.

In these processes it should be noted that a portion of the reactant liquid is recycled via an internal recycle conduit back to the bottom of the vessel, generally by positive pumping means mounted at the bottom of the recycle conduit. For effective operation of the vessel it is desirable that a minimum amount of vapor phase fluid be recycled. Besides reducing the amount of recycled liquid, vapor in the recycled liquid due to vortexing or poor vapor-liquid separation leads to recycled pump inefficiencies. Also, vapor in the withdrawn liquid stream represents a loss of hydrogen.

SUMMARY OF THE INVENTION

Accordingly, we have invented improved vapor-liquid separation apparatus for use in an upflow reactor vessel. The apparatus comprises, in combination with the vessel, a vertical open ended recycle conduit mounted internally in the vessel and a liquid drawoff pipe having a downwardly opening inlet port mounted above the recycle conduit upper end. Preferably the drawoff pipe opening is flared to increase inlet area and reduce liquid velocity adjacent the inlet, and the recycle conduit upper end is a funnel shaped downcomer with an internally mounted deflector within the downcomer and a set of vertical vanes at the bottom of the downcomer.

The disengaging means is preferably a drawoff pan having a conical bottom and a cylindrical sidewall with a top edge above the drawoff pipe inlet. The pan has an orifice centrally located in the conical bottom thereof.

An object of the apparatus according to this invention is to provide improved vapor-liquid separation in an upflow reactor vessel.

Another object of the present invention is to provide vapor-liquid separation prior to withdrawing liquid from a reactor vessel, and prior to recycling a portion of the liquid to the bottom of the vessel.

Other objects and advantages of the apparatus according to the present invention will become apparent from the brief description of the drawings and the preferred embodiments which follow.

BRIEF DESCRIPTION OF THE PREFERRED EMBODIMENTS

Figure 1:
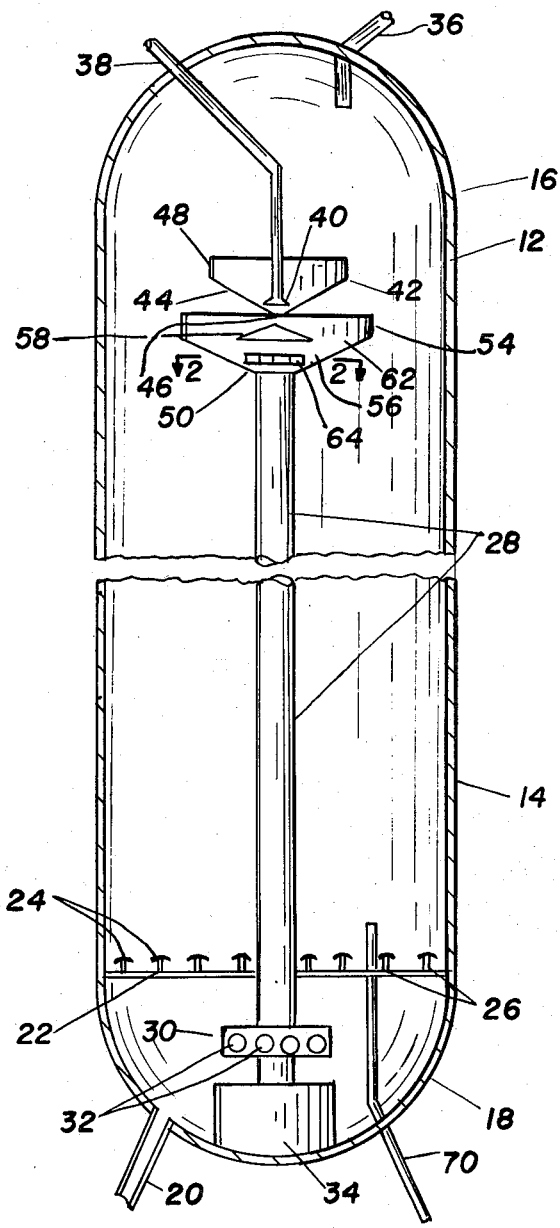
FIG. 1 shows in cross-sectional view the apparatus according to the present invention.

As indicated, the present invention concerns apparatus for separating liquid phase material from vapor phase material in the upper portion of an operating upflow type reactor vessel. The type of reactor vessel employed is of a type used in a process commercially designated the "H-Oil" Process, in which various intermediate and heavy hydrocarbon feelstocks are subjected as desired to hydrogeneration, hydrocracking, hydrosulfurization, etc. To this end the feedstock is passed upwardly in the reactor vessel together with hydrogen through a particulate catalyst bed. The reactor vessel is maintained at relatively high temperature and pressures, the respective conditions ranging from 650° F. to 900° F. and from 1000 p.s.i. to 5000 p.s.i. The upward superficial velocity of fluid through the catalyst bed in the reactor vessel is sufficient to cause the particulate catalyst in the bed to exhibit random particulate motion, and to expand up to five times its quiescent volume. To accomplish this, recycling of a portion of the fluid reactants from the top of the vessel above the catalyst bed to below the bed is practiced. To accomplish such recycling of reactants a recycle conduit is vertically mounted in the vessel with open ends above and below the catalyst bed, and if desired a pump is attached to the lower end of the recycle conduit to provide increased positive flow within the conduit and the vessel. A portion of the recycle conduit can be located externally. From the point of view of pump operating efficiency and superficial upward liquid velocity through the catalyst bed, it is necessary to keep the amount of vapor material entrained in the recycled fluid to the minimum. Also because the products are generally lower boiling materials, conversion rates are enhanced by not recycling vapor material. It is therefore necessary to design the upper part of the recycle conduit and the reactor to minimize vapor entrained in the liquid recycle.

In certain operations it is also desirable to effect a separation of the reactor vessel effluent stream according to phase. This eliminates the need for a separate vapor-liquid separator, possibly operated at reactor pressure and temperature. The apparatus according to the present invention is operated to effectively achieve vapor-liquid separation for both the liquid internal recycle stream and the liquid stream withdrawn overhead.

Referring now to the drawing, a reactor vessel 12 embodying the apparatus of the present invention is shown. The reactor vessel is a thick walled high pressure, high temperautre cylindrical structure 14 having upper and lower hemispherical end caps respectively designated 16 and 18. Incoming feedstock and a hydrogen containing gas are introduced into the vessel 12 through a feedpipe 20 which passes into the bottom of the vessel. Also mounted in the lower portion of the vessel is a one way bubble cap tray 22 acting as a one way flow grid. The tray 22 is mounted horizontally in the vessel and attached by suitable means to the vessel side wall, and comprises a number of bubble caps 24 acting in concert with passages 26 through the tray to prevent backflow of material to below the tray.

A relatively large diameter recycle conduit 28 is vertically mounted within the vessel and extends from below the bubble cap tray 22 to a level above that at whcih the upper boundary of the expanded catalyst bed is maintained. As shown the recycle conduit 28 passes centrally through a hole in the tray and is directly connected at its bottom end to the inlet of a horizontally mounted centrifugal pump 30. The pump 30 has an impeller, not shown, rotating about a vertical axis, and diffuser ports 32 radially located around the periphery of the pump casing. A pump motor 34 is attached to the bottom of the casing and drives the pump impeller by suitable shaft and connections, also not shown.

Vapor effluent is withdrawn overhead from the vessel 12 via a vapor effluent withdrawal pipe 36 which passes through and opens into the space enclosed by the upper end cap 16 of the vessel. Another withdrawal pipe, specifically a liquid drawoff pipe 38 also passes through the upper end cap 16 and leads down centrally to a point below the level at which the upper level of liquid reactant in the vessel is maintained. The drawoff pipe 38 is flared outwardly to present a downwardly directed wide mouth inlet 40 at its opening in the vessel. A drawoff pan 42 is suitably mounted in spaced relation below and surrounding the drawoff pipe inlet 40. The drawoff pan functions to enclose a volume of liquid reactant in the space surrounding the flared inlet 40 of the drawoff pipe and in connection therewith to control fluid flow into the pan and at the inlet to the drawoff pipe so as to reduce vortexing and entrainment of vapor phase materials prior to the reactants entry into the inlet 40. To this end the drawoff pan 42 has a conical bottom 44 with a small orifice 46 located at the apex thereof and an annular shell 48 connected to the circumference of the conical bottom. The upper rim of the pan shell is positioned so as to be below the upper level of the liquid in the operating vessel. The orifice 46 functions as an escape port for any entrained catalyst in the drawoff pan.

The drawoff pan is positioned above the upper end of the recycle conduit 28. The recycle conduit has a funnel shaped extension 50 connected at the extension bottom to the recycle conduit, and comprising a ring shaped wall 54 as the upper rim of the funnel extension and a frusto-conical joining section 56 between the rim and the vertical recycle conduit tube. The extension 50 is proportioned to impart minimum velocity to liquid entering the recycle stream and therefore minimize vapor and catalyst entrainment. Mounted within the funnel shaped section by suitable spacers or brackets, not shown, is a deflector 58 which is structurally a shallow cone, coaxially mounted in the funnel extension 50 and in combination with the section 56, forms at base of the section 56 a reduced area annular flow region 62. The deflector 58 acts to reduce vortexing in the downcomer. Mounted at the narrow end of the funnel section just above the recycle conduit is a baffle 64 which acts to straighten fluid flow into the conduit and also to cause a relatively sharp right angle fluid flow profile from the flow region 62 to the baffle 64. In the same manner the deflector 58 causes liquid within the funnel extension 50 to move over a longer flow path from the downcomer inlet to the baffle and acts to prevent vortexing.

Figure 2:
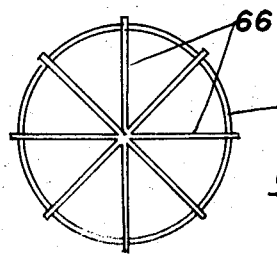
FIG. 2 is a top view taken along section 2—2 of FIG. 1.

Referring to FIG. 2 of the drawings, it is seen that the baffle 64 is formed from a number of equally spaced vertically mounted radially extending vanes 66 enclosed in a ring 68 and suitably attached to the section wall.

In operation an expanded bed of particulate catalyst is maintained in the vessel 12 above the bubble cap tray 22 with an upper boundary being maintained below the downcomer head opening. A catalyst removal conduit 70 is shown opening into the vessel space in which the bed is maintained and is used periodically or continually remove spent catalyst. The withdrawal rate of liquid from the vessel is controlled so as to maintain an upper liquid level above the drawoff pan 42 but below the vapor effluent withdrawal pipe. Sufficient space is provided between the drawoff pan and the vapor effluent withdrawal pipe opening to prevent liquid carryover with the vapor.

Having fully described the apparatus of our invention and wishing to cover those variations and modifications which would be apparent to those skilled in the art without departing from either the spirit or scope thereof.

We claim:

1. In a reactor vessel having means for introducing liquid and gaseous reactants thereto and for withdrawing liquid and vapor product therefrom, vapor-liquid separation apparatus comprising:
    (a) a vertical open ended recycle conduit mounted internally within said vessel and having a funnel shaped extension at its upper end,
    (b) a liquid draw-off pipe having a downwardly open inlet mounted in said vessel above the upper end of said recycle conduit, and
    (c) vapor-liquid disengaging means positioned above said recycle conduit and surrounding the downwardly opening inlet of the liquid draw-off pipe, said disengaging means having an orifice in the lower portion thereof.

2. The apparatus of claim 1 in which the vapor-liquid disengaging means is generally funnel shaped with the orifice at the base of the funnel and in which said orifice, said recycle conduit and said liquid draw-off pipe are in substantial axial alignment.

3. The apparatus of claim 2 which also includes a cone-shaped deflector mounted in the funnel-shaped extension of the recycle conduit at a spaced distance from the sides of said extension with its apex upward and axially aligned with said recycle conduit, said liquid draw-off pipe and the orifice in said vapor-liquid disengaging means.

4. The apparatus of claim 2 in which the downwardly opening inlet of the liquid draw-off pipe comprises an inverted frusto-conical section whereby the cross-sectional area of said inlet is increased.

5. The apparatus of claim 2 additionally comprising a plurality of vertically mounted vanes mounted within the lower portion of the funnel shaped extension of the recycle conduit.

References Cited
UNITED STATES PATENTS

| | | | |
|---|---|---|---|
| 3,124,518 | 3/1964 | Guzman et al. | 23—288 E X |
| 3,188,286 | 6/1965 | Van Driesen | 23—288 E X |
| 3,523,763 | 8/1970 | Van Driesen et al. | 23—288 |
| 3,003,580 | 10/1961 | Lanning | 208—157 X |
| 3,197,288 | 7/1965 | Johanson | 23—289 |

JOSEPH SCOVRONEK, Primary Examiner

U.S. Cl. X.R.

23—285, 289; 55—426; 208—143, 157